(12) United States Patent
Raffa et al.

(10) Patent No.: US 10,694,155 B2
(45) Date of Patent: Jun. 23, 2020

(54) PERSONAL SENSORY DRONES

(71) Applicant: Intel Corporation, Santa Clara, CA (US)

(72) Inventors: Giuseppe Raffa, Portland, OR (US); Glen J. Anderson, Beaverton, OR (US); Lenitra M. Durham, Beaverton, OR (US); Richard Beckwith, Hillsboro, OR (US); Kathy Yuen, Portland, OR (US); Joshua Ekandem, Rex, GA (US); Jamie Sherman, Portland, OR (US); Ariel Moshkovitz, Haifa (IL); Omer Ben-Shalom, Rishon (IL); Jennifer Healey, San Jose, CA (US); Stephen Brown, Portland, OR (US); Tamara Gaidar, Haifa (IL); Yosi Govezensky, Nofit (IL)

(73) Assignee: Intel Corporation, Santa Clara, CA (US)

( * ) Notice: Subject to any disclaimer, the term of this patent is extended or adjusted under 35 U.S.C. 154(b) by 966 days.

(21) Appl. No.: 14/750,803

(22) Filed: Jun. 25, 2015

(65) Prior Publication Data

US 2016/0378109 A1    Dec. 29, 2016

(51) Int. Cl.
*G05D 3/00* (2006.01)
*H04N 7/18* (2006.01)
(Continued)

(52) U.S. Cl.
CPC ............. *H04N 7/185* (2013.01); *G05D 1/005* (2013.01); *G05D 1/0027* (2013.01);
(Continued)

(58) Field of Classification Search
CPC ..... H04N 7/185; G05D 1/0027; G05D 1/0038
See application file for complete search history.

(56) References Cited

U.S. PATENT DOCUMENTS 9,643,722 B1 * 5/2017 Myslinski ............. B64C 39/024
9,692,498 B2 * 6/2017 Fan .................... H04B 7/18504
(Continued)

FOREIGN PATENT DOCUMENTS

| CN | 107667521 | 2/2018 |
| JP | 2012140101 | 7/2012 |

(Continued)

OTHER PUBLICATIONS

"International Application Serial No. PCT/US2016/034119, International Preliminary Report on Patentability dated Jan. 4, 2018", 10 pgs.

(Continued)

*Primary Examiner* — Adam M Alharbi
(74) *Attorney, Agent, or Firm* — Schwegman Lundberg & Woessner, P.A.

(57) ABSTRACT

Various systems and methods for personal sensory drones are described herein. A personal sensory drone system includes a drone remote control system comprising: a task module to transmit a task to a drone swarm for the drone swarm to execute, the drone swarm including at least two drones; a transceiver to receive information from the drone swarm related to the task; and a user interface module to present a user interface based on the information received from the drone swarm.

22 Claims, 7 Drawing Sheets

(51) Int. Cl.
*G05D 1/00* (2006.01)
*H04N 5/232* (2006.01)
*G08G 5/00* (2006.01)

(52) U.S. Cl.
CPC ......... *G05D 1/0038* (2013.01); *G08G 5/0013* (2013.01); *G08G 5/0043* (2013.01); *G08G 5/0069* (2013.01); *H04N 5/232* (2013.01); *B64C 2201/123* (2013.01); *B64C 2201/143* (2013.01)

(56) References Cited

U.S. PATENT DOCUMENTS

| | | | |
|---|---|---|---|
| 9,836,049 B1* | 12/2017 | Tu | ................ H04B 7/18504 |
| 2010/0224732 A1 | 9/2010 | Olson et al. | |
| 2010/0268409 A1 | 10/2010 | Vian et al. | |
| 2010/0277588 A1 | 11/2010 | Ellsworth et al. | |
| 2012/0083947 A1 | 4/2012 | Anderson et al. | |
| 2013/0289858 A1* | 10/2013 | Mangiat | ............... G05D 1/0027 701/117 |
| 2014/0172194 A1 | 6/2014 | Levien et al. | |
| 2015/0025713 A1 | 1/2015 | Klinger et al. | |

FOREIGN PATENT DOCUMENTS

| | | |
|---|---|---|
| JP | 2018522302 A | 8/2018 |
| WO | 2016209504 | 12/2016 |

OTHER PUBLICATIONS

"International Application Serial No. PCT/US2016/034119, International Search Report dated Sep. 5, 2016", 3 pgs.

"International Application Serial No. PCT/US2016/034119, Written Opinion dated Sep. 5, 2016", 8 pgs.

"Japanese Application Serial No. 2017-553408, Voluntary Amendment filed Jan. 4, 2018", w/ claims in English, 6 pgs.

"European Application Serial No. 16814960.7, Extended European Search Report dated Jan. 7, 2019", 7 pgs.

\* cited by examiner

PERSONAL SENSORY DRONES

TECHNICAL FIELD

Embodiments described herein generally relate to sensory augmentation devices and in particular, to personal sensory drones.

BACKGROUND

Aerial drones or unmanned aerial vehicles (UAV) have become more popular in recent years due to the reduction in component cost and increase in interest. Manufacturing and miniaturization continue to advance drone technology and produce smaller, lighter drones with more capabilities. Several military and civil applications have been developed, including reconnaissance, border patrolling, crop surveying, filmmaking, search and rescue operations, and parcel delivery.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a system for personal sensory drones. Drones and other robots constitute a new technology that may disrupt life in many aspects, from surveillance and security to shipments, disaster aid, work tasks, military applications, etc. Many people could benefit from drones that enable remote sensing capabilities. For example, people with vision impairment, mobility issues, or hearing problems may benefit from remote sensing providing by drones.

The present disclosure discusses an improvement to the operation of autonomous unmanned vehicles. Drones that are personal to a user may be used in a swarm or individually to provide content to the user. In a swarm, drones may be synchronized to provide an integrated sensory environment to the user. For example, several drones may stitch together video so that a user may view the video feeds as if they were a single feed. The user may have a virtual reality headset or other panoramic vision system to experience a wide angle view (e.g., 360 degree view) of an object or a scene. Alternatively, several drones may be used to provide different fields of view (FOV), perspectives, or video feeds (e.g., infrared and visible light views) to a user who may toggle between different views or experience several views side by side in an aggregated display. Similar mechanisms may be provided for other senses such as hearing, touching, or smelling. The drones may also allow a form of remote sensing so that a user may have smells and haptic representations brought back by the drone. This may also assist users with mobility problems that prevent them from walking up to the object of interest. In effect, personal drones may augment a user's senses.

Figure 1:
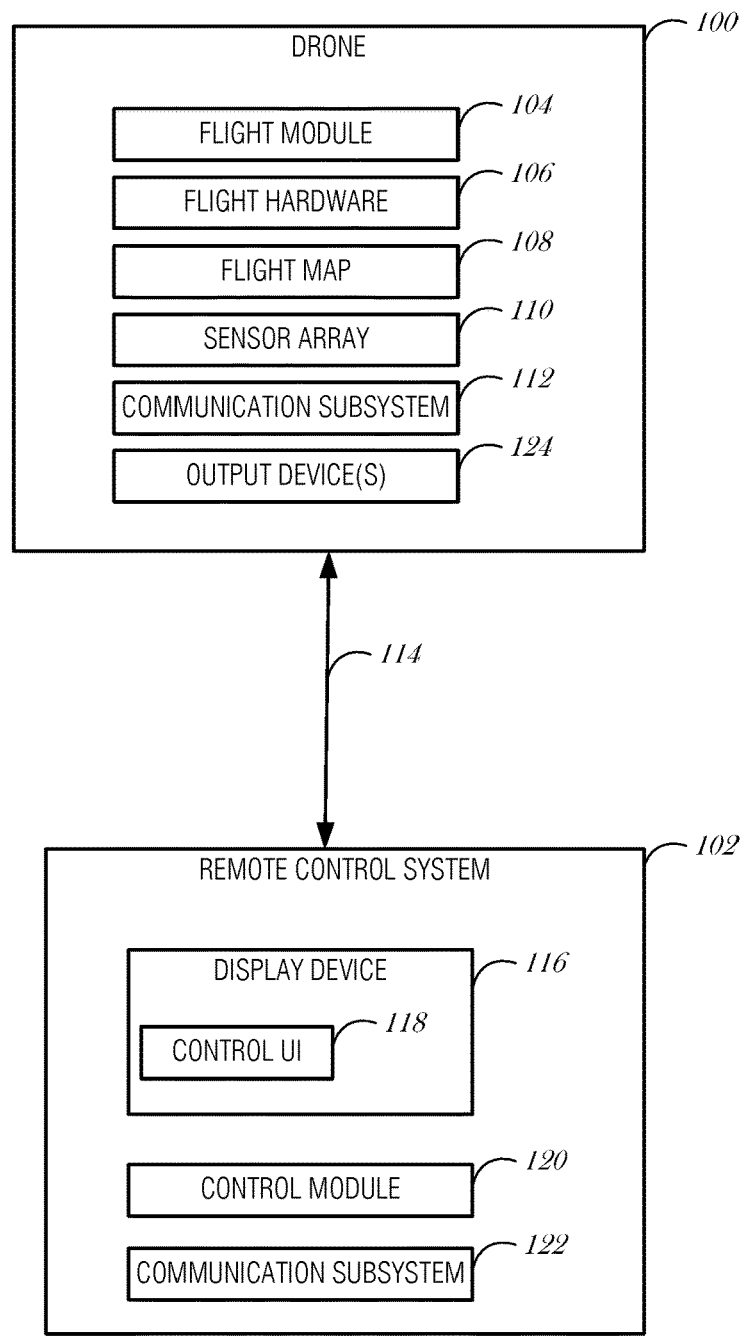
FIG. 1 is a diagram illustrating components of a drone and a remote control system, according to an embodiment.

FIG. 1 is a diagram illustrating components of a drone 100 and a remote control system 102, according to an embodiment. The drone 100 may also be referred to as a semi-autonomous vehicle or robot, which may be land-based, maritime vehicles, unmanned aerial vehicle (UAVs), or the like. For discussion purposes, the drone 100 discussed herein is an unmanned aerial vehicle (UAV). The remote control system 102 may present one or more user interfaces (UI) to one or more users and be used to control the drone 100. For example, a UI may display a map of an area and allow a user to select waypoints that the drone 100 may follow. Communication between the remote control system 102 and the drone 100 is bi-directional. As such, images and other information captured by the drone 100 may be transmitted back to the remote control system 102 for display to the user, who may then respond with additional commands or other parameter changes.

The drone 100 includes a flight module 104, flight hardware 106, a flight map 108, a sensor array 110, and a communication subsystem 112. The drone 100 may operate semi-autonomously based on commands received from the remote control system 102. For example, when the drone 100 receives a navigation command that includes a destination—such as GPS coordinates and desired altitude—the drone 100 may move to the destination without further user input. The drone 100 may also include output devices 124, such as a display or speakers.

The flight hardware 106 includes the components of the drone 100 that propel or otherwise move the drone 100. For example, the flight hardware 106 for a quadrotor helicopter UAV (also known as a quadcopter), may include four propellers. The flight hardware 106 may vary depending on the type of drone 100 (e.g., wheels for a ground-based unit). The flight hardware 106 may also include a GPS receiver. The GPS receiver may be capable of differential GPS (DGPS) or real time kinematic (RTK) GPS. The flight hardware 106 may also include at least one processing unit (e.g., a central processing unit, a graphical processor, or an application-specific integrated circuit). The processing unit may execute software stored on the drone 100 to perform the functions described herein of the drone 100.

The flight map 108 includes data representing a geographic area, which may include roads, arena seating, audience stands, stages, fields, playing surfaces, or the like, and GPS coordinates of various features of these geographic areas. The flight map 108 includes altitude data of the geographic area. The data may also include location data of man-made objects such as bridges, cell towers, etc. Furthermore, the flight map 108 may include a database of point-of-interest (POI) locations including, but not limited to restaurants, businesses, gas stations, stadiums, golf courses, etc. It is understood that the flight map 108 may include additional geographic, structural, or logistical details to allow the drone 100 to operate in a semi-autonomous or fully-autonomous nature. When several drones 100 are used to perform a task, the flight map 108 may include zones where each drone 100 is assigned coverage to increase coverage and to reduce the possibility of collisions.

The sensor array 110 includes one or more sensors. Data captured by the sensor array 110 may be used internally by the drone 100 during navigation or externally by operators of the drone 100. Sensors may include, but are not limited to, temperature sensors, pressure sensors, electro-optical sensors, infrared sensors, depth cameras, camera arrays, microphone arrays, gyroscopes, accelerometers, proximity sensors, microphones, and magnetometers.

In various examples, autonomous movement of the drone 100 is accomplished using flight module 104 and one or more of the sensor array 110, the flight hardware 106, and the flight map 108. In an example, the flight module 104 includes collision detection logic. To this end, readings from a proximity sensor in the sensor array 110 may be used to determining how close the drone 100 is to an object (e.g., a wall or another drone). In an example, data stored in the flight map 108 (in combination with sensor readings) is used to avoid objects. For example, the drone 100 may navigate around known locations of tall structures (e.g., cell towers, buildings) or fly to a sufficient height before proceeding to a location. For ground-based drones 100, the drone 100 may avoid known areas with water, holes, or the like.

The flight module 104 may also utilize image data obtained using an electro-optical or infrared sensor to avoid collisions with objects. For example, the flight module 104 may analyze image data using pattern matching algorithms to classify an object in the path of the drone 100 while moving.

The flight module 104 may also be used to coordinate positioning, flight patterns, camera angles, sensor configuration, and other aspects of drone operation among several drones that are acting together as a drone swarm. While FIG. 1 illustrates a single drone 100, it is understood that multiple drones 100 may act together to complete a task assigned by a user. Coordination among the drones in a swarm may be autonomously performed by a combination of drones in the swarm (e.g., cooperative computing) or by a master drone of the swarm (e.g., central computing).

The communication subsystem 112 includes one or more receivers, transmitters, or transceivers to communicate with the remote control system 102 over one or more networks. In an example, a control instruction is received by the communication subsystem 112 over the network connection (e.g., network 114). The control instruction may indicate what the next course of action is for the drone 100. For example, the control instruction may be a navigation instruction, a general directive, or other configuration setting. The communication subsystem 112 may relay the control instruction to the flight module 104 at which point the flight module 104 implements the instruction.

A network 114 communicatively connects the drone 100 with the remote control system 102. The network 114 may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 114 may include a single local area network (LAN), a wide-area network (WAN), or combinations of LAN's or WAN's, such as the Internet. The network 114 may provide a secure, encrypted, or proprietary connection between the remote control system 102 and the drone 100.

The remote control system 102 may be a standalone device or part of another device. The remote control system 102 may be a smartphone executing a remote control application, a tablet, a wearable device (e.g., smartglasses), a transmitter with a dual-stick layout and a display, a laptop, etc. The remote control system 102 may be a combination of devices, such as smartglasses for providing visual feedback to the user and camera-based control to the drone 100 and an e-textile glove to provide the user tactile feedback from the drone 100. The e-textile glove may be used to point at potential objects of interest or as another user input device in various embodiments. The remote control system 102 may also include at least one processing unit (e.g., a central processing unit, a graphical processor, an application-specific integrated circuit) that includes one or more cores. The at least one processing unit may execute software stored on the remote control system 102 to perform the functions described herein.

The remote control system 102 includes a display device 116, a control user interface 118, a control module 120, and a communication subsystem 122. The display device 116 is a display on the remote control system 102 that presents the control user interface 118. The control user interface 118 may include various input controls to allow a user to configure the drone's (or drone swarm's) operation. Various parameters or settings may be configured by the user via the control user interface 118 including, but not limited to, search parameters, footage properties, and other settings.

Search parameters are used by the drone 100 to find objects, people, or paths. Search parameters may include geographic locations (e.g., GPS coordinates), waypoints, paths, types of hazards to avoid, types of business to find, etc. Search parameters may be limited to a certain task or type of task. For example, a task may be to run forward reconnaissance for a user who is out for a jog on a wooded trail. During the task, the drone 100 may be used in conjunction with other drones 100 to scout the trail ahead of the user to alert the user of any hazards. Hazards for this type of task may be limited to fallen trees, muddy or flooded areas of the trail, and washed out areas of the trail.

Footage properties may include the pixel resolution, number of perspectives of an object, storage preferences (e.g., file type, storage location, retention policy, etc.), image or video quality (e.g., standard definition or high definition), whether to store the image/video data locally, or unicast or broadcast it, or other aspects of the video or image being captured.

User input may include touch input on the control user interface 118, voice input, hand gestures above the remote control system 102, or physical movement or manipulation of the remote control system 102 (e.g., using dual-stick controls). Detection of the input may be accomplished using one or more sensors of the remote control system 102 (not illustrated) such as accelerometers, microphones, gyroscopes, or cameras. When user input is detected, the control module 120 may retrieve a control instruction for the drone 100 and then transmit the control instruction using the communication subsystem 122 over network connection 114 to the drone 100.

During operation, the drone 100 may be configured for various tasks. The tasks are generally designed to augment one or more of the user's senses. Tasks may be broadly grouped into two types: assisted navigation and inspection. Assisted navigation tasks are tasks where the user is travelling or moving by some mechanism, and the drone 100 or drone swarm is used to assist the user with navigation by scouting the user's path for obstacles, hazards, or other things that may delay or deny the user passage. In the urban context, the physical environment constantly changes due to a variety of factors, due to weather, motor accidents, construction, and other events. These changes may occur in relatively small areas in comparison to the global map. Drones may be used to provide localized, live data at a fine resolution (e.g., street level, block by block, etc.).

In various examples, the drone 100 analyzes data in an image database to determine how a geographic region has changed over time. For example, many things may cause a geographic region to change. These changes may categorized in a number of ways, including but not limited to, environmental changes, infrastructure change, and traffic hazards. In some instances a change may have multiple categories. Environmental changes may include changes due to weather such as mudslides, landslides, tornados, floods, avalanches, droughts, etc Infrastructure changes may include changes in man-made structures such as bridge deterioration, house fires, collapsed buildings, etc. Traffic hazards may be from changes on navigable roads due to traffic patterns changes (e.g., heavy traffic), road blockages (e.g., debris on a road), or wildlife being present on a road. Other categories may also be used without departing from the scope of this disclosure.

As an example, the user may go on a run early in the morning before the sun has fully risen in an urban environment where there is uneven pavement. The drone 100 may be configured to detect a potential tripping hazard ahead of the user and send an audible or haptic alert to the user's wearable devices, e.g., a Bluetooth headset, fitness watch, smartphone, etc. The drone 100 may also scout ahead when choosing between various routes to detect where there is the least amount of obstruction on the user's route, which may be preconfigured or dynamically determined Obstructions may be people taking pets on walks, highly congested streets, construction, temporary closures, and other temporal forces.

As another example, in an outdoor context with limited connectivity, the user may download maps to the drone 100 to provide navigation prior to beginning a trail run. In off-trail situations, the drone 100 may be configured to move ahead of the user to guide the user away from potential hazards and impassable conditions, such as loose rocks or cliff edges. The drone 100 may also be used to direct the user back to a more heavily used trail. The drone 100 may help in situations by identifying feasible routes across difficult terrain (e.g., ravines or crevasses). This type of scouting is a real challenge as climbers and trail hikers often cannot tell the best route to take. Also, due to weather or time, conditions may shift quickly and without warning, rendering known routes suddenly impassable. Real time scouting in this instance is very useful.

The other type of general task is an inspection task. Inspection tasks are designed to allow a person to remotely inspect an object, person, or thing using a single drone 100 or a drone swarm. Various types of inspection may be provided, including visual, audio, tactile, or olfactory. The user may direct the drone 100 or drone swarm to a particular object, person, or thing using various user controls. In an example, the user is able to indicate to the drone 100 the object/area to cover, for visual and/or audio recording by touching on the control user interface 118 the object/area to be inspected by the drone 100. The user may be presented a map on which the user may indicate a location or position to inspect. Alternatively, the user may use a camera on the remote control system 100 to frame an object in a camera's viewer and the drone 100 may use object recognition technologies, which may be aided by location/direction sensors or eye tracking, to determine the object of interest. In an embodiment, The perspective of the output from the drone 100 may be correlated to the user's visual or auditory perspective. This may be enabled, for example, by the user wearing one or more of an eye tracker, head-mounted compass, or head-mounted microphone array to determine the direction of the user's gaze or relative position to a sound in the environment that is being recorded by the drones 100. The drone 100 may provide a presentation via the output device 124 of the drone swarm to correlate with the user's perspective relative to the visual or auditory source in the environment.

Once an object of interest has been identified and transmitted to the drone 100 or the drone swarm, the drone(s) 100 may leverage the nine degrees of freedom sensors 110 (accelerometers, gyroscopes, and magnetometers), object recognition, and other imaging techniques to capture image data, audio data, tactile data, or olfactory data of the object of interest. The drone swarm may include ground-based (terrestrial) robots that may obtain camera angles that may be difficult for aerial drones, and vice versa. Also, some drones in a drone swarm may have distinct or particular sensors that other drones of the drone swarm do not have. This may due to payload capacities or battery limits, or other operational limits on single drones. The drone swarm, the remote control system 102, or another system may coordinate the multiple input streams from the drone swarm.

Figure 2:
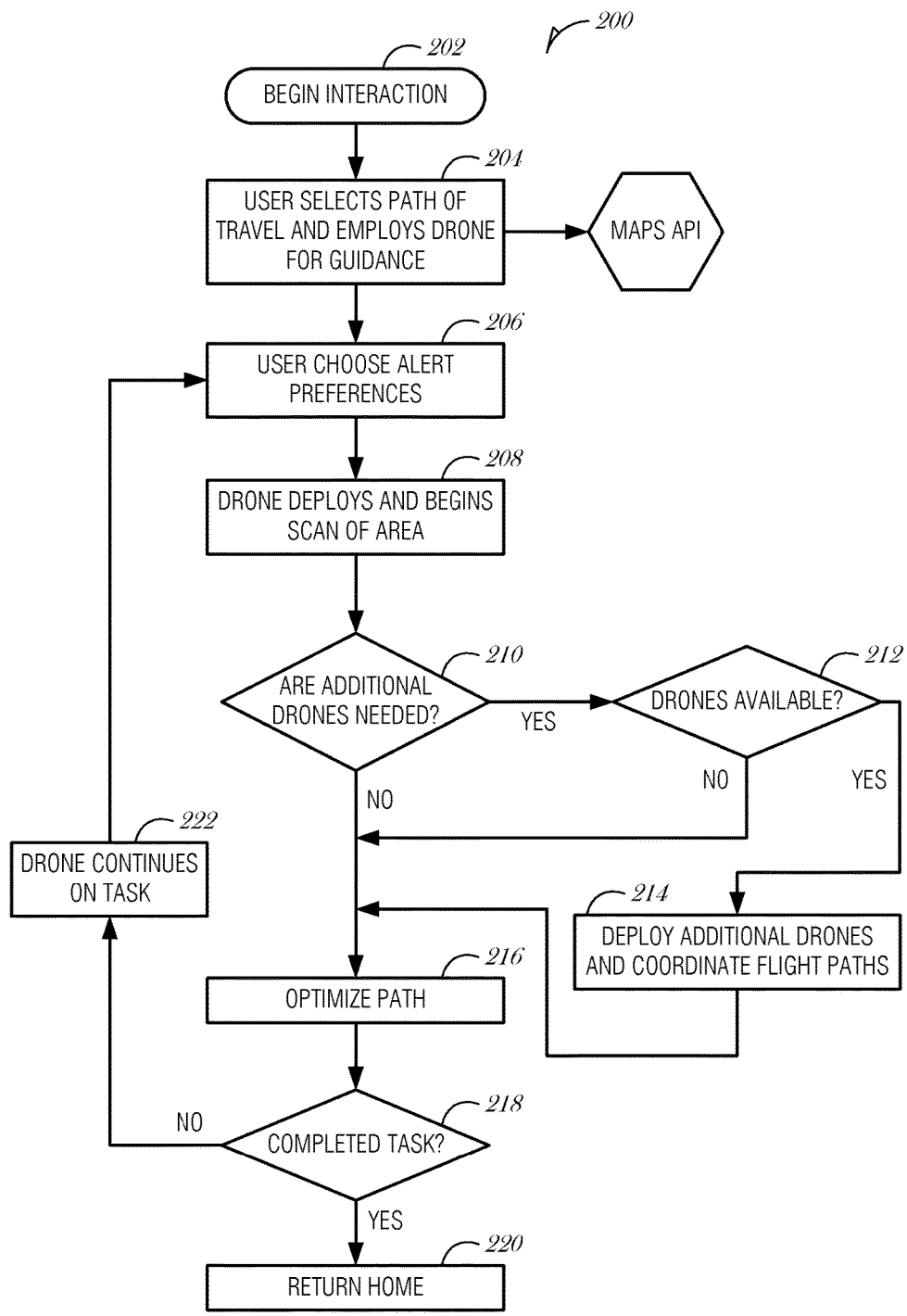
FIGS. 2-4 are flowcharts illustrating control and data flow during operation, according to an embodiment.
Figure 3:
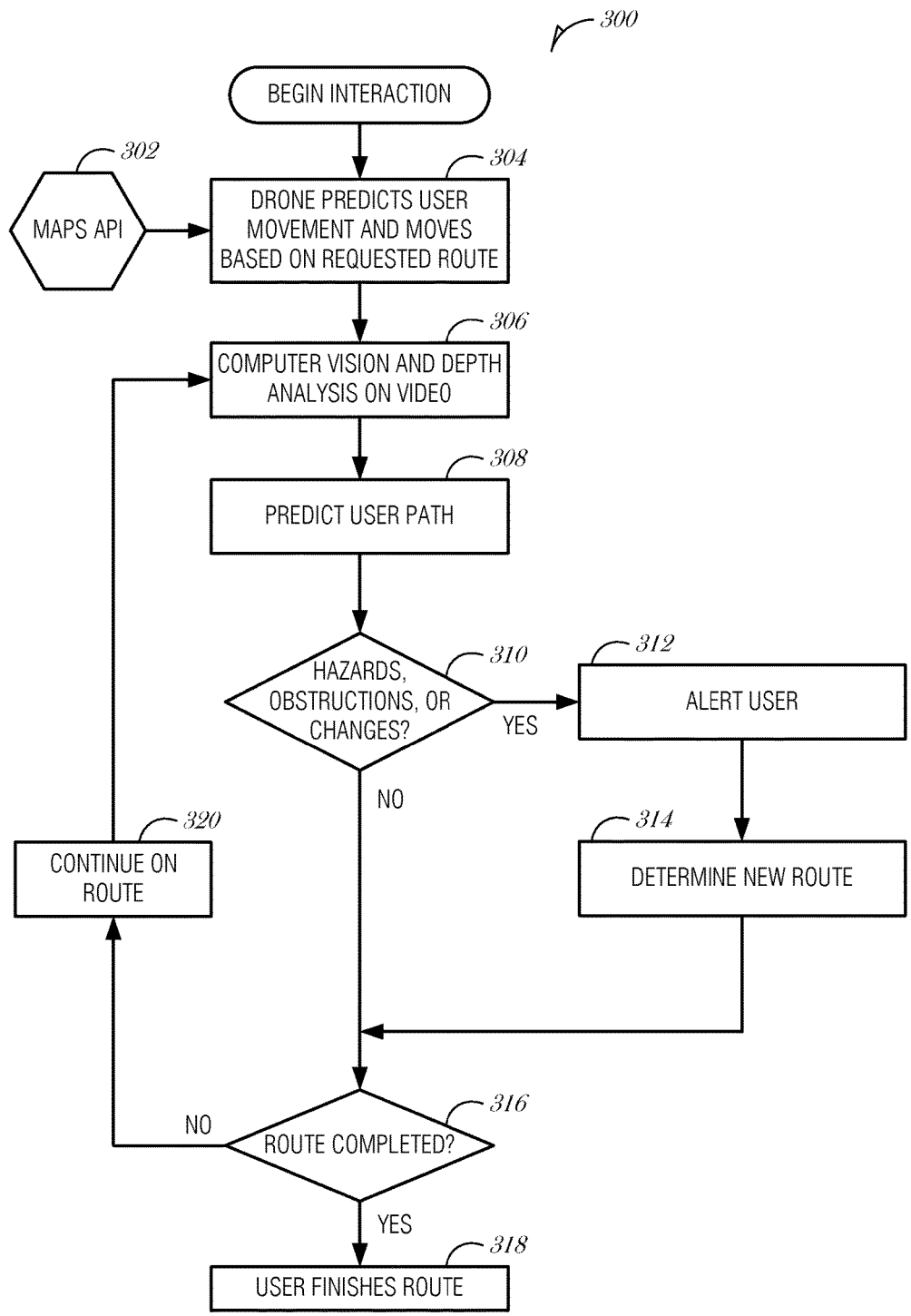
Figure 4:
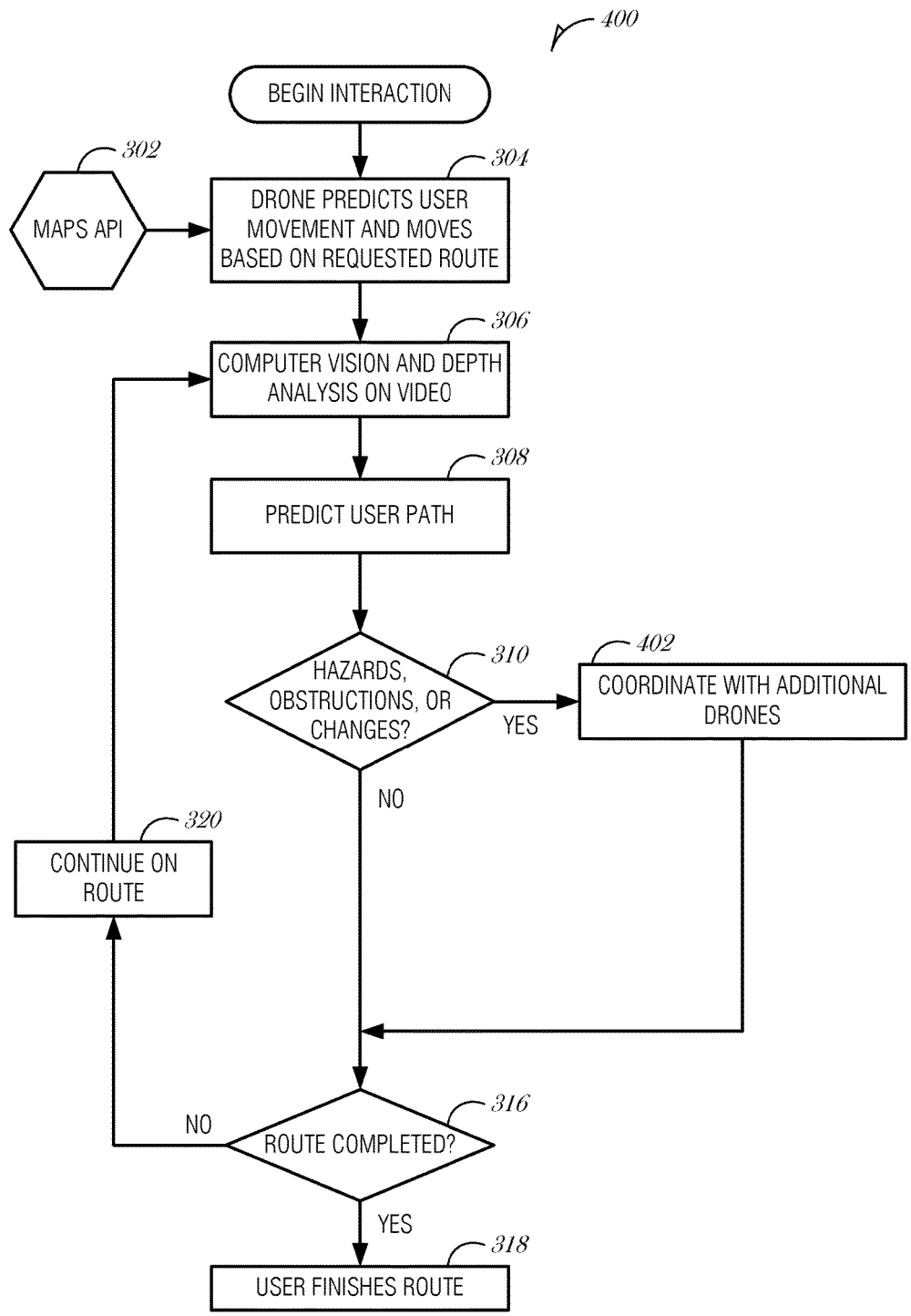

FIGS. 2-4 are flowcharts illustrating control and data flow during operation, according to an embodiment. At state 202, an interaction between a user and a drone begins. The user selects a path of travel and activates the drone for guidance (operation 204). The user chooses alert preferences, e.g., what the drone should alert the user of, such as parking spots, uneven pavement, a donut shop, etc. (operation 206). The drone deploys (operation 208) and begins scanning an area. At decision block 210, it is determined whether more drones are needed. This may be due to needing a finer level of granularity, needing to scan a large area in near real time, or to bring other sensors, camera perspectives, or operational modes into the drone swarm's capabilities. If additional drones are needed, then at decision block 212 it is determined whether there are additional drones to be deployed. Drones may be supplied by a community pool or from a private pool. Communities may provide drones for residents, for example. Otherwise, a private citizen may own and operate a fleet of drones to be used in different situations. Alternatively, private and public drones may be recruited and work together.

If there are additional drones available, then at operation 214 the additional drones are deployed and the drone swarm coordinates flight paths. This coordination may be performed using cooperative planning or distributed planning Cooperative planning may be performed amongst the drones in the drone swarm by each drone sharing its location, flight path, remaining battery life, current task or subtask, capabilities (e.g., available sensors), direction sensors are facing, and the like with other drones in the swarm. Based on each other's abilities, location, and other factors, each drone may intelligently decide to take an action or a series of actions. When a drone determines an action or series of actions, it may inform the other drones in the swarm, which may affect the pending or available actions that other drones may perform.

Alternatively, in a distributed drone planning scheme, a single drone (or a user) may identify a task or subtask for each drone in the swarm. Distributed drone planning and control may be easier to implement due to reduced communication and control routines used, but may be awkward to maintain control for a user who wants to concentrate on another task (e.g., trail running) Thus, different configuration modes may be provided for different user bases.

In either a cooperative or distributed planning scheme, when one drone is disabled (e.g., low battery, damaged due to a collision, etc.), another drone or drones may cover for the disabled drone. The disabled drone's responsibilities may be distributed among the remaining drones in the drone swarm or a new drone may be called in to replace the disabled drone. Sensor data, images, videos, or other information may be communicated from the disabled drone to one or more drones in the drone swarm to preserve the information and communicate the information back to the user.

At operation 216, the path is optimized to ensure that there is sufficient coverage for the user's path. With a single drone, the coverage may be a relatively narrow cone, such as a forward cone of 15 degrees coverage. With more drones, a wider forward cone may be covered. With enough drones, a full 360 degrees coverage may be provided to scout the user's forward and rearward direction to alert the user of hazards that the user is approaching (e.g., a rock fall that is blocking the trail ahead) and that are approaching from the rear (e.g., a biker on the trail approaching from behind).

Periodically or regularly, the drone determines whether the task is complete (decision block 218). When the task is complete, the drone returns to base (operation 220) to recharge or be made available for a new deployment with the user or another user. When the task is not yet complete, the drone (or drones) continue on task (operation 222) and the flow returns to 206, where the parameters are rechecked and may be used to define a new aspect of the task, which may involve the use of more or fewer drones.

FIGS. 3 and 4 illustrate the drone control and data flow, according to embodiments. In FIG. 3, when a user selects a path of travel (operation 204), a maps application programming interface (API) is invoked and provides information to the drone (operation 302). The drone uses the path of travel provided by the user and the maps API to predict the user movement and initiate drone movement based on predicted user movement (operation 304). The drone uses computer vision and depth analysis to analyze a video feed obtained from one or more cameras on the drone (operation 306). The drone predicts the user's path (operation 308). This may be performed primarily based on the user's selected path of travel. This may also be performed by tracking the user's previously chosen path in a given area. This may also be performed by analyzing the user's current direction, speed, and capabilities. For example, a user in a wheelchair may not be expected to travel over rocky terrain or climb steep inclines. Thus a relatively flat portion of an off-road trail may be identified as the predicted user path over a steep inclined portion.

As the user traverses the path of travel, the drone scans for potential hazards, obstructions, or changes along the route (operation 310). When the drone identifies a potential hazard, obstruction, or change, the drone transmits an alert to the user (operation 312). The alert may be provided using one or more mechanisms, such as via Bluetooth™ headphones, a smartwatch, a smart phone, or the like, using audio, haptic, or visual alert modes (or combinations thereof). Alerts may be presented on a user device (e.g., a smartwatch or the drone remove control device) or from one or more drones in the drone swarm. The alerts may be configured by the user as notification preferences.

A new route may be chosen for the user (operation 314) and communicated to the user. One or more routes may be presented. The user may be provided a user interface to choose a route selection or confirm a route change. If the user's route is completed (decision block 316), then the user finishes the route (state 318) and the interaction ends. If the route is not finished, then the user continues on the route (state 320) and the control and data flow continue to operation 302.

FIG. 4 illustrates a similar control and data flow as that in FIG. 3, with the difference that when hazards, obstructions, or changes along the route are detected (operation 310 of FIG. 3), additional drones are used to improve mapping granularity, geographic coverage, or to implement additional sensors (operation 402). The addition of drones may be based on the type of hazard, obstruction, or change along the route. For example, when a tree has fallen and blocks the hiker's path, then a single drone may be able to scout an alternative path and suggest an alternative route. In contrast, when the obstacle or hazard is larger, such as a forest fire, then additional drone may be used to scout the perimeter of the fire zone and suggest alternative routes. The use of additional drones may also be necessary to expedite the re-routing when a fast-moving fire is involved.

Hazard, obstacle, and route changes in operation 310 may be based on environmental factors, such as low light or shadows. For example, as light fades, a user who is trail running may be in more danger of tripping or falling on portions of trail that are too dark. Several drones may be used to ensure that the user is informed of dark, dangerous areas of the trail. Terrestrial drones may be used for areas where trees and other objects may make it difficult for a flying drone to safely scout. As another example, as daylight fades, a drone may be configured to scan for a suitable camp site that is within a certain area around the user based on the user's hiking speed, remaining light, lighting conditions, trail location, water availability (e.g., a nearby stream), etc.

Figure 5:
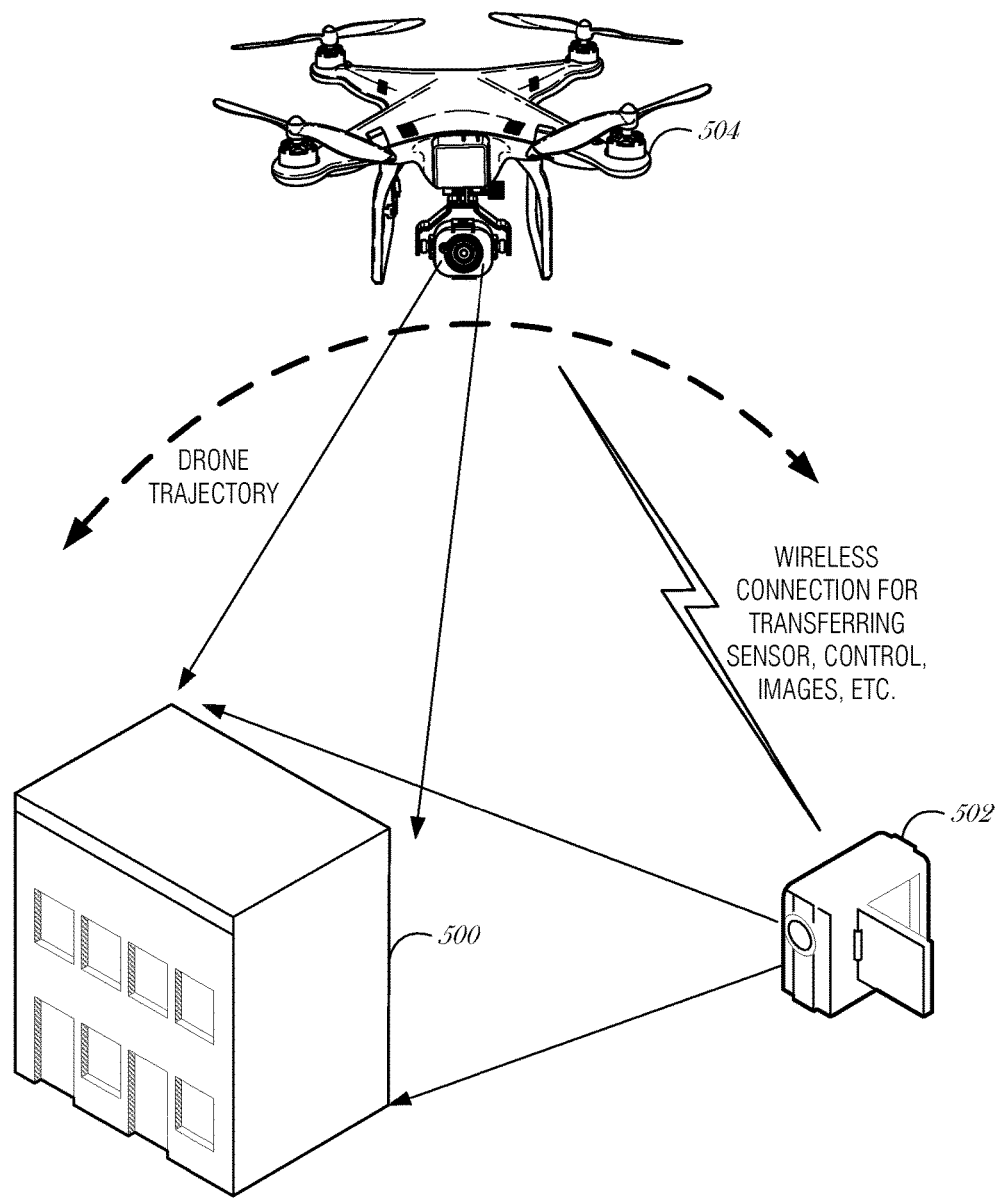
FIG. 5 is a diagram illustrating operation of a drone, according to an embodiment.

FIG. 5 is a diagram illustrating operation of a drone, according to an embodiment. From a control perspective, the user is able to indicate to the drone the object or area to cover, investigate, or monitor. The user may view an object 500 with a camera 502, which may be integrated into a user device (e.g., a smartphone, camcorder, etc.). Based on the field of view of the camera 502 (e.g., image, location, direction, perspective, etc.), a drone 504 is instructed to focus on the object 500 or to perform a certain action, such as a trajectory. The user of the camera 502 may interact with a display (e.g., a smartphone screen) and provide input on the image of the object 500 as captured by the camera 502, which is translated and transposed to the drone 504 to provide motion control instruction or other instructions to the drone 504.

Figure 6:
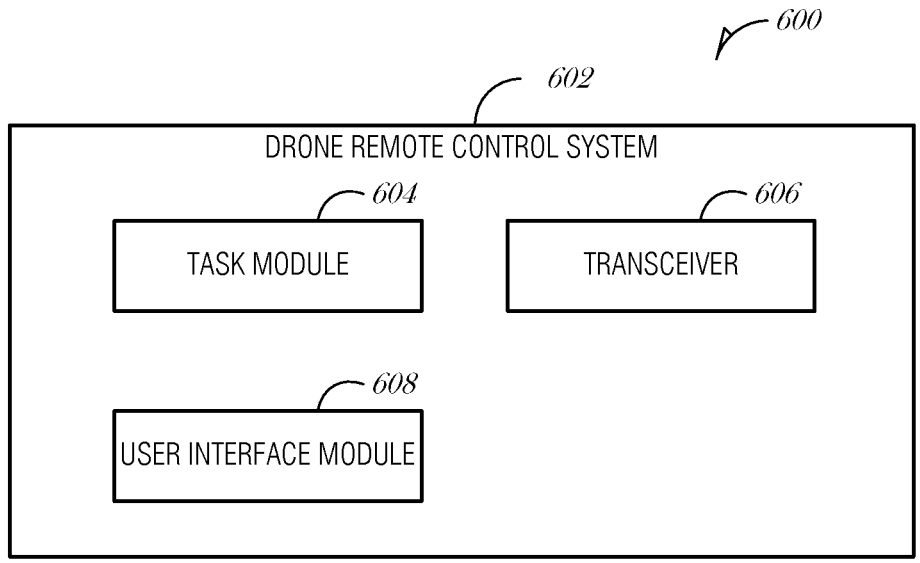
FIG. 6 is a block diagram illustrating a personal sensory drone system, according to an embodiment.

FIG. 6 is a block diagram illustrating a personal sensory drone system 600, according to an embodiment. The personal sensory drone system 600 includes a drone remote control system 602, which includes a task module 604, a transceiver 606, and a user interface module 608. The task module 604 may be configured to transmit a task to a drone swarm for the drone swarm to execute, the drone swarm including at least two drones. In an embodiment, the drone swarm includes at least one aerial drone and at least one terrestrial drone.

The drone remote control system 602 may include multiple physical devices, such as a smartwatch to communicate a map to the drone swarm and a Bluetooth™ headset to receive audible alerts from the drone swarm.

The transceiver 606 may be configured to receive information from the drone swarm related to the task. In an embodiment, the task comprises an assisted navigation task, and the transceiver is to transmit a set of parameters to the drone swarm to configure the assisted navigation task. In a further embodiment, the set of parameters includes user preferences defining a set of hazards to avoid while traversing a path, and the drone swarm scouts the path to identify a hazard from the set of hazards. In a further embodiment, the set of hazards includes a hole, a cliff, or a tripping hazard.

The user interface module 608 may be configured to present a user interface based on the information received from the drone swarm.

In an embodiment, the drone remote control system 602 comprises a navigation module to determine an alternative route and present the alternative route to the user via the user interface. In an embodiment, the drone swarm is to determine an alternative route and communicate the alternative route to the user via the user interface.

In an embodiment, the drone remote control system 602 comprises a navigation module to transmit a geographical map to the drone swarm. The geographical map may be used by the drone swarm for navigation and analyzing routes. The user may optionally upload geographical maps, which may be useful when a drone is unable to connect to a wide-area network to acquire its own maps.

In an embodiment, the task comprises an inspection task, and the user interface module 608 is to transmit an object of interest to the drone swarm, where the information received from the drone swarm includes visual data, audio data, tactile data, or olfactory data. The object of interest may be any type of object including structures, buildings, people, geographic areas, vehicles, or the like. An inspection task may direct a drone swarm to approach a stationery object of interest (e.g., a statue on the top of a building) or follow a moving object of interest (e.g., a child).

In an embodiment, to transmit the object of interest to the drone swarm, the user interface module 608 is to transmit an image of the object of interest to the drone swarm, where the drone swarm uses image analysis to identify the object of interest in a field of view of a camera mounted on at least one drone of the drone swarm. For example, the user may take a picture of an object of interest and transmit the picture to the drone swarm. The drone swarm may use image analysis and object recognition to navigate to the object in the image and inspect it.

In an embodiment, to transmit the object of interest to the drone swarm, the user interface module 608 is to transmit a geolocation to the drone swarm. The geolocation may include latitude and longitude coordinates, along with an altitude to provide a three-dimensional point in space. Alternatively, the geolocation may only include the latitude and longitude. Various geographical navigation systems may be used, such as Global Positioning System (GPS) or Global Navigation Satellite System (GLONASS). In an embodiment, the geolocation comprises global positioning system coordinates.

In an embodiment, the information received from the drone swarm includes visual data from multiple drones in the drone swarm, and the user interface module 608 is to composite the visual data from the multiple drones in the drone swarm to produce composited visual data and present the composited visual data to the user. The multiple images may be from different perspectives, using different image capture techniques, or use different fields of view. Other multi-image capture techniques may be used.

In an embodiment, to present the composited visual data, the user interface module 608 is to present multiple views of the object of interest from the respective multiple drones in the drone swarm. These may be presented like multiple camera feeds with one main window presenting the active view and user interface controls to allow the user to swap between active video feeds, one from each active drone. As discussed above, the relative camera perspective provided by the drone swarm may be correlated to the user's viewing perspective.

In an embodiment, to present the composited visual data, the user interface module 608 is to present an overlay of image data from the multiple drones. For example, one drone may capture infrared images and another drone may capture visible light images. The user may optionally activate and deactivate one or more layers (visible, infrared) to view the object of interest in several views.

In an embodiment, to present the composited visual data, the user interface module 608 is to build a three-dimensional model of the object of interest from the visual data provided from the multiple drones. With enough visual information, the object of interest may be rendered as a three-dimensional object. A user with a virtual reality system may then interact with the three-dimensional object in virtual space.

In an embodiment, to present the composited visual data, the user interface module 608 is to present a view of the object of interest that corresponds to a viewing perspective of the user.

In an embodiment, the information received from the drone swarm includes audio data from multiple drones in the drone swarm, and the user interface module 608 is to select an audio signal from one of the multiple drones in the drone swarm, the audio signal having the strongest signal-to-noise ratio of available audio signals from the multiple drones in the drone swarm.

In an embodiment, the user interface module 608 is to combine the audio signal from one of the drones of the drone swarm with a video signal provided by the drone controller, to produce an audio-visual presentation; and present the audio-visual presentation in the user interface. For example the drone controller may have a world-facing camera so that the user may act as the videographer. However, in some situations, e.g., long range surveillance of a bird, the user may not be close enough to the object of interest to hear. The drone may act as a long range microphone in such a situation.

In an embodiment, the information received from the drone swarm includes tactile data from at least one drone in the drone swarm, and the user interface module 608 is to coordinate a tactile response with a wearable device being worn by the user to recreate a tactile feel of the object of interest. The tactile information may be acquired using a physical feeler or antenna that is used to sweep the surface of the object of interest. Alternatively or in combination with physical data acquisition, a drone may use high-resolution imaging and other analysis to determine a texture, firmness, or other tactile information of the object of interest. The user may be able to remotely feel an object using equipment that provides a tactile user interface. One such piece of equipment is a glove with haptic feedback mechanism, such as kinesthetic force and vibrotactile feedback. In an embodiment, the wearable device comprises a glove.

In an embodiment, the information received from the drone swarm includes olfactory data from at least one drone in the drone swarm, and to present the user interface based on the information received from the drone swarm, the user interface module 608 is to present a representation of a smell corresponding with the olfactory data. In an embodiment, the representation of the smell is a chemical name, structure, or indication. The indications may be a picture of an object that produces a similar or same smell (e.g., rotten eggs for sulfur).

Using a small vacuum and an airtight, sterile canister, for example, a drone in the drone swarm may capture a small amount of ambient air. The ambient air may be tested using various filters, microscopes, chemicals, or the like. Alternatively, the drone may deliver the air sample to the user for testing, smelling, or the like. In an embodiment, the information received from the drone swarm includes olfactory data from at least one drone in the drone swarm, the olfactory data being a sample of the air around the object of interest.

In an embodiment, the information received from the drone swarm includes olfactory data from at least one drone in the drone swarm, and the drone remote control system 602 is to identify an allergy that the user has, and to present the user interface, the user interface module 608 is to present a warning to the user that the object of interest may be an allergen. The user may indicate allergens in a user preferences or control section, which may then be referenced when testing an air sample. Allergen testing may be performed by using microscopes, chemical testing, etc. For example, the drone may capture a small amount of ambient air around the object of interest, the air may be vacuumed through one or more filters, each with smaller passageways to capture particulate matter. Then using a microscope (or other optical technique) and an image library, the drone may identify particulates that match allergens in the image library. Particle counts for pollen or mold may be determined using a similar mechanism or by using other mechanisms, such as an adhesive surface to capture pollen and mold, the microscopic analysis of the adhesive surface to estimate counts.

Figure 7:
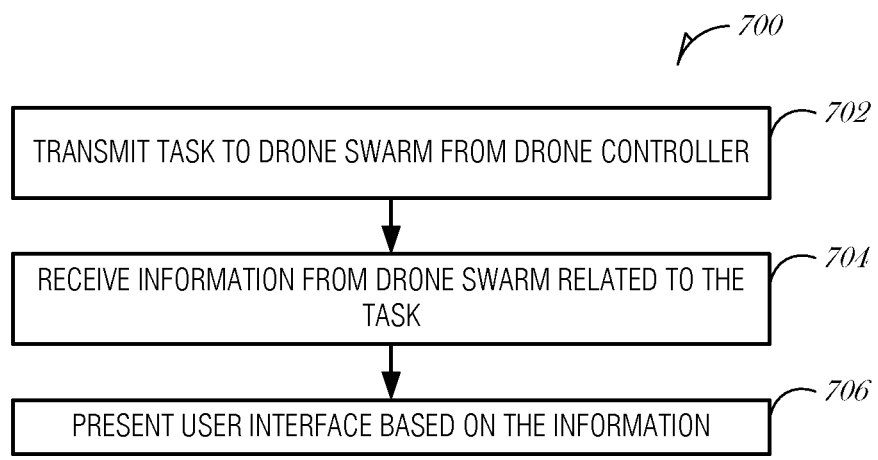
FIG. 7 is a flowchart illustrating a method of implementing a personal sensory drone system, according to an embodiment.

FIG. 7 is a flowchart illustrating a method 700 of implementing a personal sensory drone system, according to an embodiment. At block 702, a task for a drone swarm to execute is transmitted from a drone controller to the drone swarm, the drone swarm including at least two drones. In an embodiment, the drone swarm includes at least one aerial drone and at least one terrestrial drone.

In an embodiment, the task comprises an assisted navigation task, and the method further comprises transmitting a set of parameters to the drone swarm to configure the assisted navigation task. In a further embodiment, the set of parameters includes user preferences defining a set of hazards to avoid while traversing a path, and the drone swarm scouts the path to identify a hazard from the set of hazards. In a further embodiment, the set of hazards includes a hole, a cliff, or a tripping hazard.

At block 704, information is received from the drone swarm related to the task. At block 706, a user interface is presented based on the information received from the drone swarm.

In an embodiment, the method 700 includes determining an alternative route and presenting the alternative route to the user in the user interface. In a further embodiment, determining the alternative route is performed by the drone swarm.

In an embodiment, the method 700 includes transmitting a geographical map to the drone swarm.

In an embodiment, the task comprises an inspection task, and the method 700 further comprises transmitting an object of interest to the drone swarm, where the information received from the drone swarm includes visual data, audio data, tactile data, or olfactory data. In an embodiment, transmitting the object of interest to the drone swarm comprises transmitting an image of the object of interest to the drone swarm, the drone swarm uses image analysis to identify the object of interest in a field of view of a camera mounted on at least one drone of the drone swarm.

In an embodiment, transmitting the object of interest to the drone swarm comprises transmitting a geolocation to the drone swarm. In an embodiment, the geolocation comprises global positioning system coordinates.

In an embodiment, the information received from the drone swarm includes visual data from multiple drones in the drone swarm, and the method 700 further comprises compositing the visual data from the multiple drones in the drone swarm to produce composited visual data and presenting the composited visual data to the user. In a further embodiment, presenting the composited visual data comprises presenting multiple views of the object of interest from the respective multiple drones in the drone swarm. In another embodiment, presenting the composited visual data comprises presenting an overlay of image data from the multiple drones. In another embodiment, presenting the composited visual data comprises building a three-dimensional model of the object of interest from the visual data provided from the multiple drones.

In an embodiment, presenting the composited visual data comprises presenting a view of the object of interest that corresponds to a viewing perspective of the user.

In an embodiment, the information received from the drone swarm includes audio data from multiple drones in the drone swarm, and the method 700 further comprises selecting an audio signal from the multiple drones of the drone swarm, the audio signal having the strongest signal-to-noise ratio of available audio signals from the multiple drones in the drone swarm. In an embodiment, the method 700 includes combining the audio signal from one of the drones of the drone swarm with a video signal provided by the drone controller, to produce an audio-visual presentation; and where presenting the user interface based on the information received from the drone swarm comprises presenting the audio-visual presentation in the user interface.

In an embodiment, the information received from the drone swarm includes tactile data from at least one drone in the drone swarm, and the method 700 further comprises coordinating a tactile response with a wearable device being worn by the user to recreate a tactile feel of the object of interest. In an embodiment, the wearable device comprises a glove.

In an embodiment, the information received from the drone swarm includes olfactory data from at least one drone in the drone swarm, and presenting the user interface based on the information received from the drone swarm comprises presenting a representation of a smell corresponding with the olfactory data. In an embodiment, the representation of the smell is a chemical name, structure, or indication.

In an embodiment, the information received from the drone swarm includes olfactory data from at least one drone in the drone swarm, the olfactory data being a sample of the air around the object of interest.

In an embodiment, the information received from the drone swarm includes olfactory data from at least one drone in the drone swarm, and the method further comprises identifying an allergy that the user has, and presenting the user interface comprises presenting a warning to the user that the object of interest may be an allergen.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
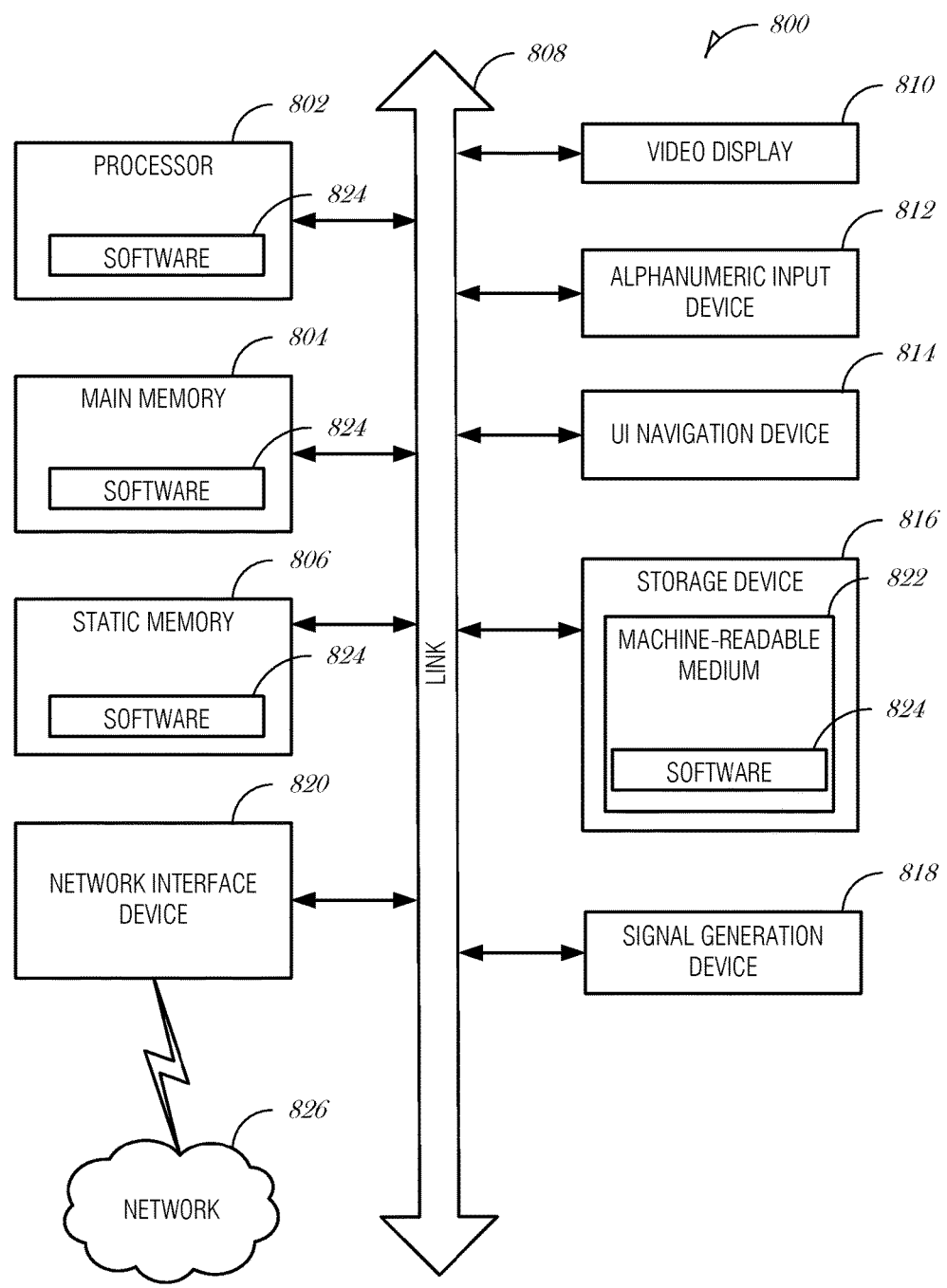
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for personal sensory drones (such as a device, apparatus, or machine) comprising: a drone remote control system comprising: a task module to transmit a task to a drone swarm for the drone swarm to execute, the drone swarm including at least two drones; a transceiver to receive information from the drone swarm related to the task; and a user interface module to present a user interface based on the information received from the drone swarm.

In Example 2, the subject matter of Example 1 may include, wherein the drone swarm includes at least one aerial drone and at least one terrestrial drone.

In Example 3, the subject matter of any one of Examples 1 to 2 may include, wherein the task comprises an assisted navigation task, and the transceiver is to: transmit a set of parameters to the drone swarm to configure the assisted navigation task.

In Example 4, the subject matter of any one of Examples 1 to 3 may include, wherein the set of parameters includes user preferences defining a set of hazards to avoid while traversing a path, and wherein the drone swarm scouts the path to identify a hazard from the set of hazards.

In Example 5, the subject matter of any one of Examples 1 to 4 may include, wherein the set of hazards includes a hole, a cliff, or a tripping hazard.

In Example 6, the subject matter of any one of Examples 1 to 5 may include, wherein the drone remote control system comprises a navigation module to: determine an alternative route; and present the alternative route to the user via the user interface.

In Example 7, the subject matter of any one of Examples 1 to 6 may include, wherein the drone swarm is to: determine an alternative route; and communicate the alternative route to the user via the user interface.

In Example 8, the subject matter of any one of Examples 1 to 7 may include, wherein the drone remote control system comprises a navigation module to transmit a geographical map to the drone swarm.

In Example 9, the subject matter of any one of Examples 1 to 8 may include, wherein the task comprises an inspection task, and wherein the user interface module is to: transmit an object of interest to the drone swarm, wherein the information received from the drone swarm includes visual data, audio data, tactile data, or olfactory data.

In Example 10, the subject matter of any one of Examples 1 to 9 may include, wherein to transmit the object of interest to the drone swarm, the user interface module is to: transmit an image of the object of interest to the drone swarm, wherein the drone swarm uses image analysis to identify the object of interest in a field of view of a camera mounted on at least one drone of the drone swarm.

In Example 11, the subject matter of any one of Examples 1 to 10 may include, wherein to transmit the object of interest to the drone swarm, the user interface module is to: transmit a geolocation to the drone swarm.

In Example 12, the subject matter of any one of Examples 1 to 11 may include, wherein the geolocation comprises global positioning system coordinates.

In Example 13, the subject matter of any one of Examples 1 to 12 may include, wherein the information received from the drone swarm includes visual data from multiple drones in the drone swarm, and wherein the user interface module is to: composite the visual data from the multiple drones in the drone swarm to produce composited visual data; and present the composited visual data to the user.

In Example 14, the subject matter of any one of Examples 1 to 13 may include, wherein to present the composited visual data, the user interface module is to present multiple views of the object of interest from the respective multiple drones in the drone swarm.

In Example 15, the subject matter of any one of Examples 1 to 14 may include, wherein to present the composited visual data, the user interface module is to present an overlay of image data from the multiple drones.

In Example 16, the subject matter of any one of Examples 1 to 15 may include, wherein to present the composited visual data, the user interface module is to build a three-dimensional model of the object of interest from the visual data provided from the multiple drones.

In Example 17, the subject matter of any one of Examples 1 to 16 may include, wherein to present the composited visual data, the user interface module is to present a view of the object of interest that corresponds to a viewing perspective of the user.

In Example 18, the subject matter of any one of Examples 1 to 17 may include, wherein the information received from the drone swarm includes audio data from multiple drones in the drone swarm, and wherein the user interface module is to: select an audio signal from one of the multiple drones in the drone swarm, the audio signal having the strongest signal-to-noise ratio of available audio signals from the multiple drones in the drone swarm.

In Example 19, the subject matter of any one of Examples 1 to 18 may include, wherein the user interface module is to: combine the audio signal from one of the drones of the drone swarm with a video signal provided by the drone controller, to produce an audio-visual presentation; and present the audio-visual presentation in the user interface.

In Example 20, the subject matter of any one of Examples 1 to 19 may include, wherein the information received from the drone swarm includes tactile data from at least one drone in the drone swarm, and wherein the user interface module is to: coordinate a tactile response with a wearable device being worn by the user to recreate a tactile feel of the object of interest.

In Example 21, the subject matter of any one of Examples 1 to 20 may include, wherein the wearable device comprises a glove.

In Example 22, the subject matter of any one of Examples 1 to 21 may include, wherein the information received from the drone swarm includes olfactory data from at least one drone in the drone swarm, and wherein to present the user interface based on the information received from the drone swarm, the user interface module is to present a representation of a smell corresponding with the olfactory data.

In Example 23, the subject matter of any one of Examples 1 to 22 may include, wherein the representation of the smell is a chemical name, structure, or indication.

In Example 24, the subject matter of any one of Examples 1 to 23 may include, wherein the information received from the drone swarm includes olfactory data from at least one drone in the drone swarm, the olfactory data being a sample of the air around the object of interest.

In Example 25, the subject matter of any one of Examples 1 to 24 may include, wherein the information received from the drone swarm includes olfactory data from at least one drone in the drone swarm, and wherein the drone remote control system is to identify an allergy that the user has, and wherein to present the user interface, the user interface module is to present a warning to the user that the object of interest may be an allergen.

Example 26 includes subject matter for personal sensory drones (such as a method, means for performing acts, machine readable medium including instructions that when performed by a machine cause the machine to performs acts, or an apparatus to perform) comprising: transmitting from a drone controller to a drone swarm, a task for the drone swarm to execute, the drone swarm including at least two drones; receiving information from the drone swarm related to the task; and presenting a user interface based on the information received from the drone swarm.

In Example 27, the subject matter of Example 26 may include, wherein the drone swarm includes at least one aerial drone and at least one terrestrial drone.

In Example 28, the subject matter of any one of Examples 26 to 27 may include, wherein the task comprises an assisted navigation task, and the method further comprises: transmitting a set of parameters to the drone swarm to configure the assisted navigation task.

In Example 29, the subject matter of any one of Examples 26 to 28 may include, wherein the set of parameters includes user preferences defining a set of hazards to avoid while traversing a path, and wherein the drone swarm scouts the path to identify a hazard from the set of hazards.

In Example 30, the subject matter of any one of Examples 26 to 29 may include, wherein the set of hazards includes a hole, a cliff, or a tripping hazard.

In Example 31, the subject matter of any one of Examples 26 to 30 may include, determining an alternative route; and presenting the alternative route to the user in the user interface.

In Example 32, the subject matter of any one of Examples 26 to 31 may include, wherein determining the alternative route is performed by the drone swarm.

In Example 33, the subject matter of any one of Examples 26 to 32 may include, transmitting a geographical map to the drone swarm.

In Example 34, the subject matter of any one of Examples 26 to 33 may include, wherein the task comprises an inspection task, and wherein the method further comprises: transmitting an object of interest to the drone swarm, wherein the information received from the drone swarm includes visual data, audio data, tactile data, or olfactory data.

In Example 35, the subject matter of any one of Examples 26 to 34 may include, wherein transmitting the object of interest to the drone swarm comprises: transmitting an image of the object of interest to the drone swarm, wherein the drone swarm uses image analysis to identify the object of interest in a field of view of a camera mounted on at least one drone of the drone swarm.

In Example 36, the subject matter of any one of Examples 26 to 35 may include, wherein transmitting the object of interest to the drone swarm comprises: transmitting a geolocation to the drone swarm.

In Example 37, the subject matter of any one of Examples 26 to 36 may include, wherein the geolocation comprises global positioning system coordinates.

In Example 38, the subject matter of any one of Examples 26 to 37 may include, wherein the information received from the drone swarm includes visual data from multiple drones in the drone swarm, and wherein the method further comprises: compositing the visual data from the multiple drones in the drone swarm to produce composited visual data; and presenting the composited visual data to the user.

In Example 39, the subject matter of any one of Examples 26 to 38 may include, wherein presenting the composited visual data comprises presenting multiple views of the object of interest from the respective multiple drones in the drone swarm.

In Example 40, the subject matter of any one of Examples 26 to 39 may include, wherein presenting the composited visual data comprises presenting an overlay of image data from the multiple drones.

In Example 41, the subject matter of any one of Examples 26 to 40 may include, wherein presenting the composited visual data comprises building a three-dimensional model of the object of interest from the visual data provided from the multiple drones.

In Example 42, the subject matter of any one of Examples 26 to 41 may include, wherein presenting the composited visual data comprises presenting a view of the object of interest that corresponds to a viewing perspective of the user.

In Example 43, the subject matter of any one of Examples 26 to 42 may include, wherein the information received from the drone swarm includes audio data from multiple drones in the drone swarm, and wherein the method further comprises: selecting an audio signal from the multiple drones of the drone swarm, the audio signal having the strongest signal-to-noise ratio of available audio signals from the multiple drones in the drone swarm.

In Example 44, the subject matter of any one of Examples 26 to 43 may include, combining the audio signal from one of the drones of the drone swarm with a video signal provided by the drone controller, to produce an audio-visual presentation; and wherein presenting the user interface based on the information received from the drone swarm comprises presenting the audio-visual presentation in the user interface.

In Example 45, the subject matter of any one of Examples 26 to 44 may include, wherein the information received from the drone swarm includes tactile data from at least one drone in the drone swarm, and wherein the method further comprises: coordinating a tactile response with a wearable device being worn by the user to recreate a tactile feel of the object of interest.

In Example 46, the subject matter of any one of Examples 26 to 45 may include, wherein the wearable device comprises a glove.

In Example 47, the subject matter of any one of Examples 26 to 46 may include, wherein the information received from the drone swarm includes olfactory data from at least one drone in the drone swarm, and wherein presenting the user interface based on the information received from the drone swarm comprises presenting a representation of a smell corresponding with the olfactory data.

In Example 48, the subject matter of any one of Examples 26 to 47 may include, wherein the representation of the smell is a chemical name, structure, or indication.

In Example 49, the subject matter of any one of Examples 26 to 48 may include, wherein the information received from the drone swarm includes olfactory data from at least one drone in the drone swarm, the olfactory data being a sample of the air around the object of interest.

In Example 50, the subject matter of any one of Examples 26 to 49 may include, wherein the information received from the drone swarm includes olfactory data from at least one drone in the drone swarm, and wherein the method further comprises identifying an allergy that the user has, and wherein presenting the user interface comprises presenting a warning to the user that the object of interest may be an allergen.

Example 51 includes at least one machine-readable medium including instructions, which when executed by a machine, cause the machine to perform operations of any of the Examples 26-50.

Example 52 includes an apparatus comprising means for performing any of the Examples 26-50.

Example 53 includes subject matter for personal sensory drones (such as a device, apparatus, or machine) comprising: means for transmitting from a drone controller to a drone swarm, a task for the drone swarm to execute, the drone swarm including at least two drones; means for receiving information from the drone swarm related to the task; and means for presenting a user interface based on the information received from the drone swarm.

In Example 54, the subject matter of Example 53 may include, wherein the drone swarm includes at least one aerial drone and at least one terrestrial drone.

In Example 55, the subject matter of any one of Examples 53 to 54 may include, wherein the task comprises an assisted navigation task, and the apparatus further comprises: means for transmitting a set of parameters to the drone swarm to configure the assisted navigation task.

In Example 56, the subject matter of any one of Examples 53 to 55 may include, wherein the set of parameters includes user preferences defining a set of hazards to avoid while traversing a path, and wherein the drone swarm scouts the path to identify a hazard from the set of hazards.

In Example 57, the subject matter of any one of Examples 53 to 56 may include, wherein the set of hazards includes a hole, a cliff, or a tripping hazard.

In Example 58, the subject matter of any one of Examples 53 to 57 may include, means for determining an alternative route; and means for presenting the alternative route to the user in the user interface.

In Example 59, the subject matter of any one of Examples 53 to 58 may include, wherein the means for determining the alternative route is performed by the drone swarm.

In Example 60, the subject matter of any one of Examples 53 to 59 may include, means for transmitting a geographical map to the drone swarm.

In Example 61, the subject matter of any one of Examples 53 to 60 may include, wherein the task comprises an inspection task, and wherein the apparatus further comprises: means for transmitting an object of interest to the drone swarm, wherein the information received from the drone swarm includes visual data, audio data, tactile data, or olfactory data.

In Example 62, the subject matter of any one of Examples 53 to 61 may include, wherein the means for transmitting the object of interest to the drone swarm comprise: means for transmitting an image of the object of interest to the drone swarm, wherein the drone swarm uses image analysis to identify the object of interest in a field of view of a camera mounted on at least one drone of the drone swarm.

In Example 63, the subject matter of any one of Examples 53 to 62 may include, wherein the means for transmitting the object of interest to the drone swarm comprise: means for transmitting a geolocation to the drone swarm.

In Example 64, the subject matter of any one of Examples 53 to 63 may include, wherein the geolocation comprises global positioning system coordinates.

In Example 65, the subject matter of any one of Examples 53 to 64 may include, wherein the information received from the drone swarm includes visual data from multiple drones in the drone swarm, and wherein the apparatus further comprises: means for compositing the visual data from the multiple drones in the drone swarm to produce composited visual data; and means for presenting the composited visual data to the user.

In Example 66, the subject matter of any one of Examples 53 to 65 may include, wherein the means for presenting the composited visual data comprise means for presenting multiple views of the object of interest from the respective multiple drones in the drone swarm.

In Example 67, the subject matter of any one of Examples 53 to 66 may include, wherein the means for presenting the composited visual data comprise means for presenting an overlay of image data from the multiple drones.

In Example 68, the subject matter of any one of Examples 53 to 67 may include, wherein the means for presenting the composited visual data comprise means for building a three-dimensional model of the object of interest from the visual data provided from the multiple drones.

In Example 69, the subject matter of any one of Examples 53 to 68 may include, wherein the means for presenting the composited visual data comprise means for presenting a view of the object of interest that corresponds to a viewing perspective of the user.

In Example 70, the subject matter of any one of Examples 53 to 69 may include, wherein the information received from the drone swarm includes audio data from multiple drones in the drone swarm, and wherein the apparatus further comprises: means for selecting an audio signal from the multiple drones of the drone swarm, the audio signal having the strongest signal-to-noise ratio of available audio signals from the multiple drones in the drone swarm.

In Example 71, the subject matter of any one of Examples 53 to 70 may include, means for combining the audio signal from one of the drones of the drone swarm with a video signal provided by the drone controller, to produce an audio-visual presentation; and wherein the means for presenting the user interface based on the information received from the drone swarm comprise means for presenting the audio-visual presentation in the user interface.

In Example 72, the subject matter of any one of Examples 53 to 71 may include, wherein the information received from the drone swarm includes tactile data from at least one drone in the drone swarm, and wherein the apparatus further comprises: means for coordinating a tactile response with a wearable device being worn by the user to recreate a tactile feel of the object of interest.

In Example 73, the subject matter of any one of Examples 53 to 72 may include, wherein the wearable device comprises a glove.

In Example 74, the subject matter of any one of Examples 53 to 73 may include, wherein the information received from the drone swarm includes olfactory data from at least one drone in the drone swarm, and wherein the means for presenting the user interface based on the information received from the drone swarm comprise means for presenting a representation of a smell corresponding with the olfactory data.

In Example 75, the subject matter of any one of Examples 53 to 74 may include, wherein the representation of the smell is a chemical name, structure, or indication.

In Example 76, the subject matter of any one of Examples 53 to 75 may include, wherein the information received from the drone swarm includes olfactory data from at least one drone in the drone swarm, the olfactory data being a sample of the air around the object of interest.

In Example 77, the subject matter of any one of Examples 53 to 76 may include, wherein the information received from the drone swarm includes olfactory data from at least one drone in the drone swarm, and wherein the apparatus further comprises means for identifying an allergy that the user has, and wherein the means for presenting the user interface comprise means for presenting a warning to the user that the object of interest may be an allergen.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A personal sensory drone system, the system comprising:
    a drone remote control system comprising:
        a task module to transmit a task to a drone swarm for the drone swarm to execute, the task received from a user of the drone remote control system, the drone swarm including at least two drones;
        a transceiver to receive: information from the drone swarm related to the task, the information including visual data from multiple drones in the drone swarm; and
        a user interface module to:
            composite the visual data from the multiple drones swarm to produce composited visual data; and
            present a user interface based on the information received from the drone swarm, the user interface including the composited visual data and controls for the user to selectively deploy the drones using cooperative or distributed planning.

2. The system of claim 1, wherein the drone swarm includes at least one aerial drone and at least one terrestrial drone.

3. The system of claim 1, wherein the task comprises assisted navigation task, and the transceiver is to:
    transmit a set of parameters to the drone swarm to configure the assisted navigation task.

4. The system of claim 3, wherein the set of parameters includes user preferences defining a set of hazards to avoid while traversing a path, and wherein the drone swarm scouts the path to identify a hazard from the set of hazards.

5. The system of claim 1, wherein the task comprises an inspection task, and wherein the user interface module is to:
    transmit an object of interest to the drone swarm,
    wherein the information received from the drone swarm includes visual data, audio data, tactile data, or olfactory data.

6. The system of claim 5, wherein to transmit the object of interest to the drone swarm, the user interface module is to:
    transmit an image of the object of interest to the drone swarm, wherein the drone swarm uses image analysis to identify the object of interest in a field of view of a camera mounted on at least one drone of the drone swarm.

7. The system of claim 1, wherein to present the composited visual data, the user interface module is to present multiple views of the object of interest from the respective multiple drones in the drone swarm.

8. The system of claim 1, wherein to present the composited visual data, the user interface module is to present an overlay of visual data from the multiple drones.

9. The system of claim 5, wherein to present the composited visual data, the user interface module is to build a three-dimensional model of the object of interest from the visual data provided from the multiple drones.

10. The system of claim 5, wherein to present the composited visual data, the user interface module is to present a view of the object of interest that corresponds to a viewing perspective of the user.

11. A method of implementing a personal sensory drone system, the method comprising:
    transmitting from a drone controller a drone swarm, a task to control the drone swarm and for the drone swarm to execute, the drone swarm including at least two drones;

receiving information from the drone swarm related to the task, the information including visual data from multiple drones in the drone swarm;

compositing the visual data from the multiple drones in the drone swarm to produce composited visual data; and presenting a user interface based on the information received from the drone swarm, the user interface including the composited visual data and controls for the user to selectively deploy the drones using cooperative or distributed planning.

12. The method of claim 11, wherein the set of parameters includes user preferences defining a set of hazards to avoid while traversing a path, and wherein the drone swarm scouts the path to identify a hazard from the set of hazards.

13. The method of claim 11, wherein the task comprises an inspection task, and wherein the method further comprises:

transmitting an object of interest to the drone swarm, wherein the information received from the drone swarm includes visual data, audio data, tactile data, or olfactory data.

14. At least one non-transitory machine-readable medium including instructions, which when executed by a machine, cause the machine to:

transmit from a drone controller to a drone swarm, a task for the drone swarm to execute, the task to control the drone swarm, the drone swarm including at least two drones;

receive information from the drone swarm related to the task, the information including visual data from multiple drones in the drone swarm;

composite the visual data from the multiple drones in the drone swarm to produce composited visual data; and present a user interface based on the information received from the drone swarm, the user interface including the composited visual data and controls for a user to perform additional tasks with the drone swarm.

15. The at least one non-transitory machine-readable medium of claim 14, wherein the task comprises an assisted navigation task, and the instructions further comprise instructions to:

transmit a set of parameters to the drone swarm to configure the assisted navigation task.

16. The at least one non-transitory machine-readable medium of claim 15, wherein the set of parameters includes user preferences defining a set of hazards to avoid while traversing a path, and wherein the drone swarm scouts the path to identify a hazard from the set of hazards.

17. The at least one non-transitory machine-readable medium of claim 14, wherein the task comprises au inspection task, and wherein the instructions further comprise instructions to:

transmit an object of interest to the drone swarm, wherein the information received from the drone swarm includes visual data, audio data, tactile data, or olfactory data.

18. The at least one non-transitory machine-readable medium of claim 17, wherein the instructions to present the composited visual data comprise instructions to present multiple views of the object of interest from the respective multiple drones in the drone swarm.

19. The at least one non-transitory machine-readable medium of claim 17, wherein the instructions to present the composited visual data comprise instructions to build a three-dimensional model of the object of interest from the visual data provided from the multiple drones.

20. The at least one non-transitory machine-readable medium of claim 17, wherein the instructions to present the composited visual data comprise instructions to present a view of the object of interest that corresponds to a viewing perspective of the user.

21. The at least one non-transitory machine-readable medium of claim 17, wherein the information received from the drone swarm includes tactile data from at least one drone in the drone swarm, and wherein the instructions further comprise instructions to:

coordinate a tactile response with a wearable device being worn by the user to recreate a tactile feel of the object of interest.

22. The at least one non-transitory machine-readable medium of claim 17, wherein the information received from the drone swarm includes olfactory data from at least one drone in the drone swarm, and wherein the instructions to present the user interface based on the information received from the drone swarm comprise instructions to present a representation of a smell corresponding with the olfactory data.

* * * * *

UNITED STATES PATENT AND TRADEMARK OFFICE
CERTIFICATE OF CORRECTION

PATENT NO.        : 10,694,155 B2
APPLICATION NO.   : 14/750803
DATED             : June 23, 2020
INVENTOR(S)       : Raffa et al.

Page 1 of 1

It is certified that error appears in the above-identified patent and that said Letters Patent is hereby corrected as shown below:

In the Claims

In Column 22, Line 9, in Claim 1, delete "receive:" and insert --receive-- therefor In Column 22, Line 14, in Claim 1, after "drones", insert --in the drone--

In Column 22, Line 25, in Claim 3, after "comprises", insert --an--

In Column 22, Line 65, in Claim 11, after "controller", insert --to--

In Column 24, Line 7, in Claim 17, delete "au" and insert --an-- therefor

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*